Aug. 28, 1923.

P. E. PETERSEN

ARTIFICIAL BAIT

Filed Jan. 6, 1921

1,466,545

WITNESSES

INVENTOR
P. E. PETERSEN
BY
ATTORNEYS

Patented Aug. 28, 1923.

1,466,545

UNITED STATES PATENT OFFICE.

PETER E. PETERSEN, OF BOSTON, MASSACHUSETTS; FRANK LEVERONI ADMINISTRATOR OF SAID PETER E. PETERSEN, DECEASED.

ARTIFICIAL BAIT.

Application filed January 6, 1921. Serial No. 435,463.

*To all whom it may concern:*

Be it known that I, PETER E. PETERSEN, a citizen of the United States, and a resident of Boston, in the county of Suffolk and State of Massachusetts, have invented a new and Improved Artificial Bait, of which the following is a description.

My invention relates to artificial bait or fish lure usually equipped with gang hooks in practice.

More particularly the invention relates to that type of bait in which a body made to simulate a minnow or otherwise to constitute an attractive lure is provided with a plate projecting at the under side at an angle to the longitudinal axis of the body, adjacent to the front end of the latter, for the purpose of producing a wiggling motion. While in baits in ordinary use the plate is designed to effect the wiggling motion by producing a turning movement of the bait about the axis of the body, in practice, as the lower end of the plate swings over to one side as the bait is pulled through the water, the pressure of the water on the plate forces the rear end of the bait to the opposite side and as the plate swings back a wiggling motion results. The form and arrangement of the plates in bait of the usual form rather minimizes the rotary motion of the bait and produces in the latter a more direct wiggling motion from one side to the other which falls wide of the actual motions of the natural fish.

The general object of my invention is to provide a plate so formed and arranged as primarily to develop to the utmost the rotary or turning motion of the bait about its axis and through that motion to produce an extremely rapid and vigorous wiggling motion of the bait approximating the actual motions of the live fish in swimming.

Reference is to be had to the accompanying drawings forming a part of the specification, it being understood that the drawings are merely illustrative of one example of the invention.

Figure 1:
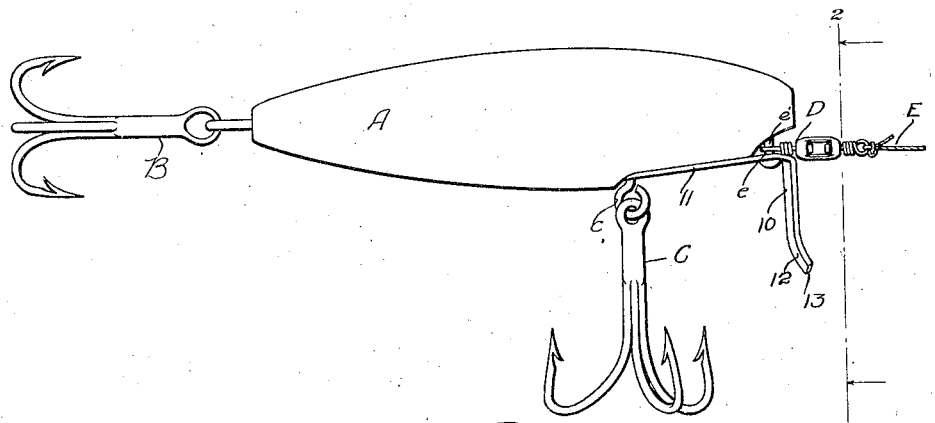
Figure 1 is a side elevation of a bait embodying my invention.
Figure 2:
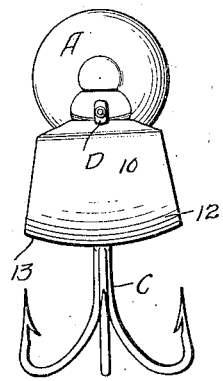
Figure 2 is a front view thereof.
Figure 3:
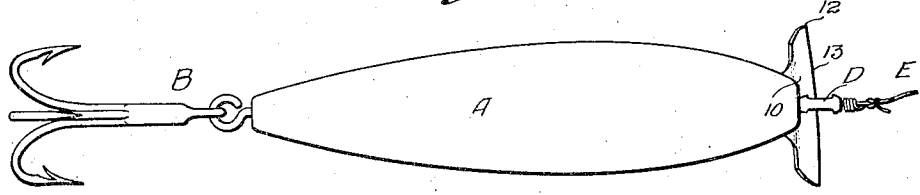
Figure 3 is a plan view.

The body A of the bait may be generally of any approved form and it may be equipped with the desired complement of hooks, there being shown a gang hook B at the tail and a pendent gang hook C at the under side. The letter D indicates the swivel to which the line E is secured, said swivel being here shown as having its eye *e* held by a transverse pin *e'* extending upwardly into the under side of the body adjacent to the front end.

The plate 10 for giving the motion to the body is formed with a rearwardly extending shank 11 suitably fastened to the body at the desired proximity or remoteness from the front end. In the example shown the rear end of the shank 11 is secured by the fastener eye *c* that secures the pendent gang hook C while at the front end of said shank the vertical pin *e* passes therethrough and into the body. It will be understood that the exact location and mode of fastening of the plate may be varied. The plate 10 is disposed at approximately a right angle to the axis of the body at the under side and at its lower edge, said plate is deflected forwardly on more or less curved lines as at 12. The extreme edge 13 of the plate is curved transversely from side to side and in substantially the true arc of a circle struck from approximately the longitudinal axis of the body and since the turning motion of the body is about its longitudinal axis, the edge 13 will describe a path in consonance with the turning movement of the body to present the minimum retardation to the turning action. As a consequence a very pronounced turning movement of the body results and following it, a rapid wiggling motion from side to side so that the motions of the lure correspond closely with the actual motions of a natural minnow.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. An artificial bait comprising a body adapted to be attached to a fish line, and a plate thereon at the under side of the body adjacent to the front end and projecting downwardly at the under side at approximately a right angle to the axis of the body, said plate having a rearwardly extending shank secured to the body at the under side, the lower portion of said plate curving forwardly, the extreme edge representing the arc of a circle struck approximately from the longitudinal axis of the body.

2. As a new article of manufacture, a plate or lure adapted to be secured to the body of an artificial bait to impart a rotary and wiggling motion to the latter, said plate having a shank extending rearwardly therefrom the body of the plate extending downwardly from the shank at an angle to the latter and deflected forwardly at its lower portion, the edge of said plate being substantially in the arc of a circle struck from an imaginary point above the shank.

PETER E. PETERSEN.